(12) United States Patent
Koya et al.

(10) Patent No.: US 8,447,834 B1
(45) Date of Patent: May 21, 2013

(54) WIRELESS CONTENT LOADING

(75) Inventors: Ramprasad Koya, Overland Park, KS (US); Nathan A. Smith, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 502 days.

(21) Appl. No.: 12/239,110

(22) Filed: Sep. 26, 2008

(51) Int. Cl.
*G06F 15/16* (2006.01)

(52) U.S. Cl.
USPC .......................................... 709/218; 709/203

(58) Field of Classification Search
USPC ................ 709/204–207, 217–219, 248, 203; 717/168–178
See application file for complete search history.

(56) References Cited

U.S. PATENT DOCUMENTS

| | | | | |
|---|---|---|---|---|
| 6,148,340 | A * | 11/2000 | Bittinger et al. .............. | 709/224 |
| 6,263,060 | B1 * | 7/2001 | MeLampy et al. ........ | 379/114.15 |
| 6,311,058 | B1 * | 10/2001 | Wecker et al. ................. | 455/418 |
| 2001/0021884 | A1 * | 9/2001 | Shinyagaito .................. | 700/275 |
| 2003/0132967 | A1 * | 7/2003 | Gangadharan ................ | 345/769 |
| 2004/0098361 | A1 * | 5/2004 | Peng ................................ | 707/1 |
| 2005/0038913 | A1 * | 2/2005 | Yasuda .......................... | 709/248 |
| 2006/0230030 | A1 * | 10/2006 | Volpa et al. ...................... | 707/3 |
| 2007/0240195 | A1 * | 10/2007 | Doran ............................... | 726/1 |
| 2008/0267218 | A1 * | 10/2008 | Linnamaki et al. ........... | 370/477 |
| 2009/0083710 | A1 * | 3/2009 | Best et al. ..................... | 717/120 |
| 2009/0307333 | A1 * | 12/2009 | Welingkar et al. ............ | 709/219 |

FOREIGN PATENT DOCUMENTS

WO  WO 0172064 A1 * 9/2001

* cited by examiner

*Primary Examiner* — Brendan Higa

(57) ABSTRACT

A method, system, and medium are provided for a computer system for downloading an application from a computing client onto a mobile information device through wireless telecommunications. An application is located from a multitude of resources available on the World Wide Web through the Internet. After an application is selected from a particular resource, it is uploaded onto the computing client. A web server receives this uploaded application by means of the Internet. Another server is used as an intermediate communications device to receive notification from the web server of the available uploaded application. This intermediate communications server notifies the mobile device by way of wireless telecommunications of a pending application that is ready for downloading onto the mobile device. The mobile device user downloads the application, which is also accomplished via wireless telecommunications.

15 Claims, 5 Drawing Sheets

WIRELESS CONTENT LOADING

BACKGROUND

Uploading and downloading applications from one computing device to another is rapidly increasing in popularity. Applications can be downloaded, for example, onto a client computing device hard drive, onto a removable medium, or onto a mobile device. In order to download an application onto a mobile device, the mobile device is conventionally wire connected to a client machine by way of a universal serial bus port, or USB port. This wired connection has certain limitations, such as physically restricting the mobile device to the same vicinity as the client machine, and allowing the downloading of one application to only one mobile device at a time.

SUMMARY

Embodiments of the invention are defined by the claims below. A high-level overview of various embodiments of the invention is provided to introduce a summary of the systems, methods, and media that are further described in the detailed description section below. This summary is neither intended to identify key features or essential features of the claimed subject matter, nor is it intended to be used as an aid in isolation to determine the scope of the claimed subject matter.

In a first embodiment, a computer system and an associated computer implemented method for downloading an application from a computing client onto a mobile information device is described. An application can be located from a multitude of information resources available on the World Wide Web through an interconnected computing network, such as the Internet. After an application is selected from a particular resource, it is uploaded onto a computing client machine, such as a desktop or laptop computer. A web server receives this uploaded application by means of the Internet. Another server is used as an intermediary communications server to receive notification from the web server of the available uploaded application by means of the Internet. This intermediary communications server notifies the mobile device by way of wireless telecommunications of the pending application that is ready for downloading onto the mobile device. In turn, the mobile device user downloads the application onto the mobile device, which is also accomplished via wireless telecommunications.

Another embodiment of the invention utilizes multiple mobile device recipients of the selected application. Multiple telephone number designations can be made in order to download the selected application onto each of the multiple mobile devices. This particular embodiment can be applied for simultaneously disseminating information to a plurality of mobile device users. It can also be applied as part of a tracking mechanism for a plurality of mobile device users.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Embodiments of the invention provide systems and methods for downloading a computer application onto a mobile information device through the use of wireless telecommunications. This detailed description satisfies the applicable statutory requirements. Although the terms "step," "block," "module," etc. might be used herein to connote different components of methods or systems employed, the terms should not be interpreted as implying any particular order among or between various steps herein disclosed unless and except when the order of individual steps is explicitly described.

Throughout the description of different embodiments of the invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of any embodiments of the invention.

Embodiments of the invention include, among other things, a method, system, or set of instructions embodied on one or more computer-readable media. Computer-readable media include both volatile and nonvolatile media, removable and nonremovable media, and media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, Random Access Memory (RAM), Read Only Memory (ROM), Electronically Erasable Programmable Read Only Memory (EEPROM), flash memory or other memory technology, Compact Disc (CD) ROM, digital versatile discs (DVD), holographic media or other optical disc storage, magnetic cassettes, magnetic tape, magnetic disk storage, and other magnetic storage devices. These technologies can store data momentarily, temporarily, or permanently. The computer readable media include cooperating or interconnected computer readable media, which exist exclusively on a processing system or distributed among multiple interconnected processing systems that may be local to or remote from the processing system.

Figure 1:
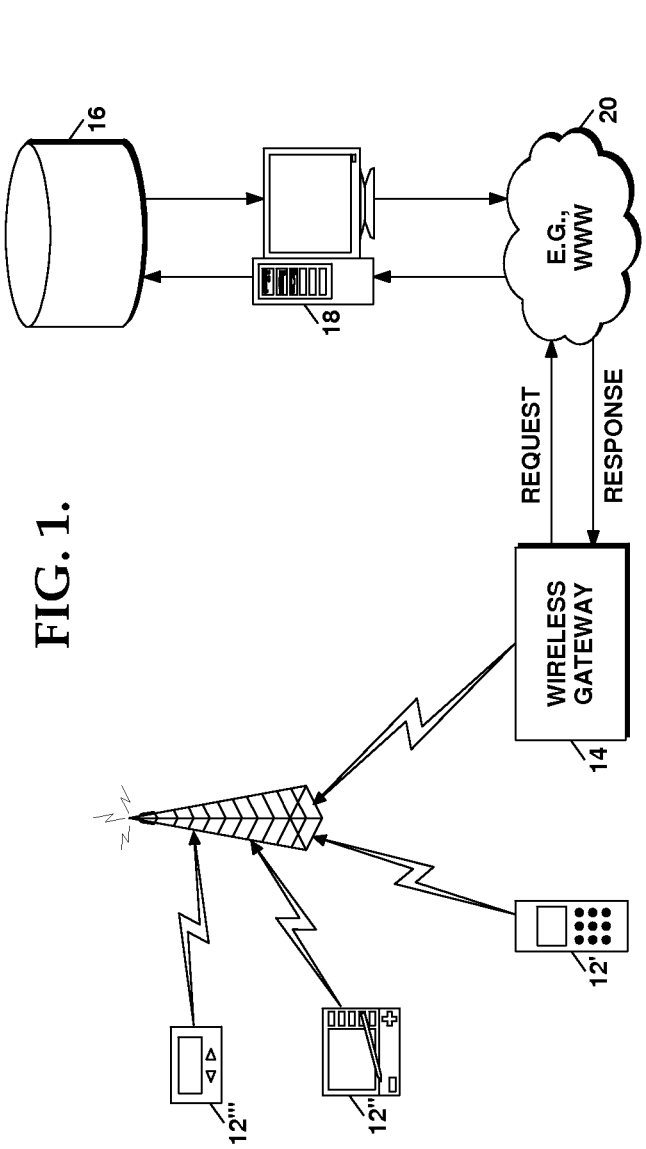
FIG. 1 is a block diagram illustrating an exemplary wireless network system.

A summary overview of a telecommunications system will be described, with reference to FIG. 1. FIG. 1 is a block diagram illustrating an exemplary wireless network system 10. Wireless network system 10 includes mobile information devices 12, wireless gateways 14, databases 16 including electronic content, database servers 18 and information network 20. However, none of the embodiments of the invention are limited to these components and more, fewer or other components can also be used in wireless network system 10. For simplicity, only one wireless gateway 14, database 16 and database server 18 are illustrated in FIG. 1.

The mobile information devices 12 include mobile phones 12', personal digital/data assistants ("PDA") 12", one and two-way pagers 12''' and other types of wireless mobile and non-mobile information devices (not illustrated).

The wireless gateways 14 provide a code division multiple access ("CDMA"), Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Radio Frequency ("RF"), paging and wireless messaging, Packet Cellular Network ("PCN"), Global System for Mobile Communications, "GSMC"), Generic Packet Radio Services ("GPRS"), Personal Communications Services ("PCS"), Cellular Digital Packet Data ("CDPD"), Wireless Application Protocol ("WAP"), Digital Audio Broadcasting ("DAB"), Bluetooth, 802.11a, 802.11b, or other types of wireless interfaces for the mobile information devices 12.

The WAP includes several protocols and standards designed to provide wireless devices with access to electronic content, and it was developed as an alternative to other markup languages and protocols developed for the World Wide Web. One component of the WAP is a Wireless Markup Language ("WML"), which includes markup tags, and provides control over formatting and layout of electronic content. The WML is often more appropriate to use for wireless devices such as wireless phones than other markup languages such as Hyper Text Markup Language ("HTML"), etc.

The databases 16 include electronic content such as text, hypertext, graphical data or references to graphical data images, audio, video, and other content. The electronic content may be stored as a web page or WAP page on a database server 18. The database server 18 downloads or "serves" electronic content from the database 16 to the mobile information device 12.

A hypertext document includes markup codes called "tags." The structure of hypertext documents is defined by document markup languages such as Hand Held Device Markup Language ("HDML"), HTML, compact HTML ("cHTML"), eXtensible Markup Language ("XML"), WML and voice extensible Markup Language (VoxML"), and others. Markup languages also allow references to additional electronic content other than text, including graphics, animation, audio, video, applets, and other electronic data.

Electronic content is displayed on a mobile information device 12 with a software application, such as but not limited to a "browser." A browser on a mobile information device 12 may be a subset of a larger browser, or a micro-browser. A micro-browser may not be capable of fully displaying content requested from the database server 18. A micro-browser reads electronic content and renders the electronic content into a presentation, such as but not limited to text, graphics, animation, audio, video, etc., for display on the mobile information device 12.

The devices illustrated in FIG. 1 interact with wireless network system 10 based on standards proposed by the Institute of Electrical and Electronic Engineers ("IEEE"), International Telecommunications Union-Telecommunication Standardization Sector ("ITU"), Internet Engineering Task Force ("IETF"), Wireless Application Protocol ("WAP") Forum, Java Community, the American National Standard Institute ("ANSI"), or other standards.

An operating environment for devices and interfaces used for embodiments of the invention include a processing system with one or more high speed central processing unit(s) ("CPU"), or other types of processors, and a memory system. In accordance with the practices of persons skilled in the art, the embodiments of the invention are described below with reference to acts and symbolic representations of operations or instructions that are performed by the processing system, unless indicated otherwise. Such acts and operations or instructions are referred to as being "computer executed," "CPU executed" or "processor executed." The memory locations where data bits are maintained are physical locations that have particular electrical, magnetic, optical, or organic properties corresponding to the data bits.

Figure 2:
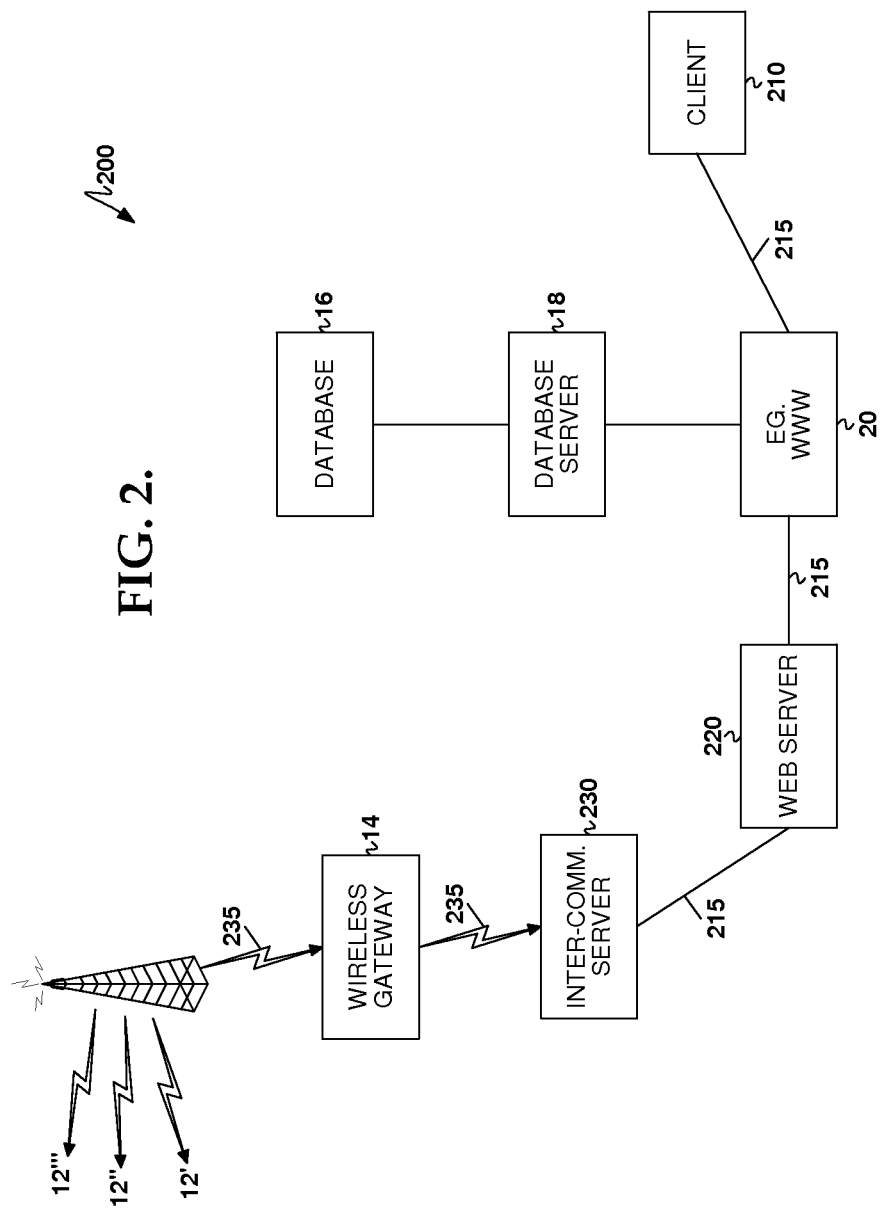
FIG. 2 is a block diagram illustrating a telecommunications and computing system, and the communication means between individual units in accordance with an embodiment of the invention.

FIG. 2 is a block diagram illustrating a telecommunications and computing system 200, and the communication means between individual units in accordance with an embodiment of the invention. In addition to the components of the wireless network system 10 of FIG. 1, the telecommunications and computing system 200 comprises a computing client 210, such as a computer desktop or laptop, for example. The computing client 210 is operative to search the contents of an information network 20, such as the World Wide Web by means of an interconnected computing network 215. In one embodiment, the interconnected computing network 215 is the Internet.

A user of the computing client 210 can select a desired file and related application to be downloaded onto a mobile information device 12 in accordance with an embodiment of the invention. This application is made available on a web page of a particular website. This website is located on and selected from the information network 20.

After the desired file and application are selected for uploading, the uploaded file and application are transferred to a web server 220 by way of the interconnected computing network 215. Through a web interface, the web server 220 exchanges transactions with a second server, which functions as an inter-communications server 230. The transaction exchanges between the web server 220 and the inter-communications server 230 occur by way of the interconnected computing network 215. The inter-communications server 230 assigns the file and application to a phone number associated with the intended recipient of the file and application, which may be a mobile information device 12.

The mobile information device 12 may download the selected file and application through a program executed on the mobile information device 12. The downloading of the file and application to the mobile information device 12 is accomplished by wireless telecommunications 235.

By way of example only and not to be construed as limited to such, the telecommunications and computing system 200 could be represented by the following. The desired file and related application to be downloaded onto a mobile information device 12 could be provided by a wireless network, such as the integrated Digital Enhanced Network (iDEN). Web server 220 could be an Application Developers Program (ADP) server, which communicates with an inter-communications server 230, such as an iFUN web server. Communication between the web server 220 and the inter-communications server 230 is through the interconnected computing network 215. The inter-communications server 230, such as the iFUN web server is necessary to communicate with the mobile information devices 12 via wireless telecommunications 235.

Figure 3:
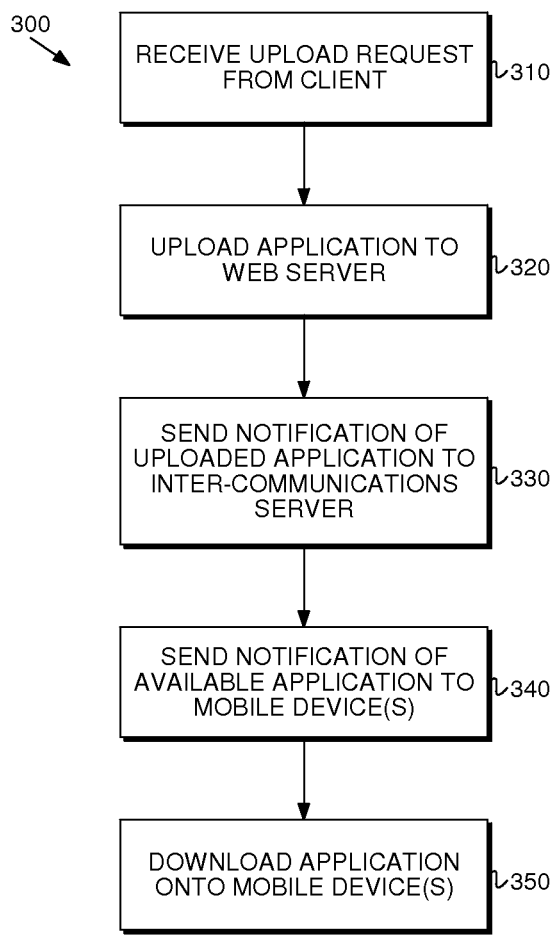
FIG. 3 is a flow diagram illustrating a telecommunications and computer implemented method according to an embodiment of the invention.

FIG. 3 is a flow diagram illustrating a telecommunications and computer implemented method 300 according to an embodiment of the invention. A user of a computing client 210 selects a file and a related application for loading onto a mobile information device 12. This request for a file and application upload is received by the selected website in step 310. After the selected file and application have been uploaded, they are transferred to the web server in step 320. As described above, the step of transferring the file and application to the web server 220 is accomplished by means of the interconnected computing network 215. Notification of the file and application being uploaded is then sent to the inter-communications server in step 330. As described above, step 330 is accomplished by means of the interconnected computing network 215. The inter-communications server sends this notification of the available file and application to the mobile information device in step 340. The step of notifying the mobile information device 12 is implemented by means of wireless telecommunications 235. The selected file and application are now ready for downloading onto the mobile information device, which is shown as step 350. The downloading step occurs by means of wireless telecommunications 235.

Figure 4:
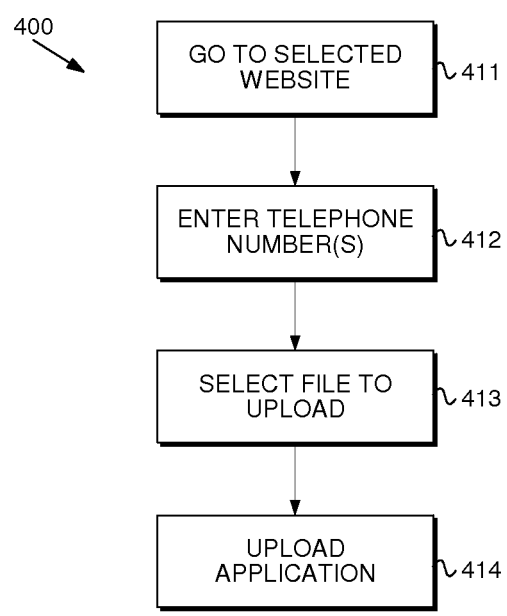
FIG. 4 is a flow diagram illustrating a computer implemented method according to an embodiment of the invention.

A flow diagram of a computer implemented method 400 for selecting a file and an application to be uploaded is illustrated, with reference to FIG. 4. At step 411, a user of a computing client 210 will use the interconnected computing network 215 to navigate the information network 20 in order to select a website containing a desired file and application to be uploaded. After the specific web page for uploading the file and application is displayed, the user will enter the telephone number associated with the mobile information device 12 that is intended to receive the downloaded file and application, at step 412. An additional embodiment of the invention includes entering multiple telephone numbers, which are associated with a plurality of mobile information devices 12. Each of the mobile information devices 12 are configured to wirelessly download the file and application from the computing client 210.

After entering the appropriate telephone number(s), step 413 requires selecting a file for uploading, such as but not limited to a zip file containing a Jad file plus a Jar file. A browse button is available at this step to assist in locating the desired file. Once the proper file has been located and selected, then the step of uploading the related application is activated or submitted in step 414. The uploaded application is then transferred to the web server 220.

Figure 5:
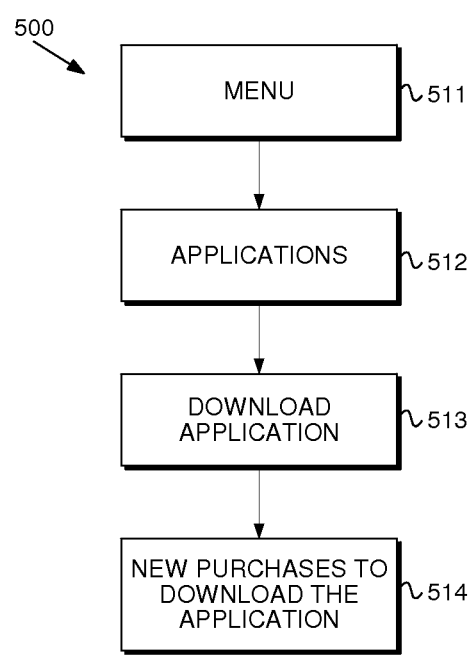
FIG. 5 is a flow diagram illustrating a mobile device implemented method according to an embodiment of the invention.

A mobile device implemented method 500 for downloading the file and application onto the mobile information device 12 is illustrated in FIG. 5. After the user of the computing client 210 has submitted the file and application upload step 414, then the user of the mobile information device 12 (which may or may not be the same person) can download the file and application. The mobile information device 12 user selects the menu option at step 511. In turn, an applications option is displayed, such as Java applications, then selected by the user at step 512. The mobile information device 12 user then selects the option to download a specific application at step 513. The application was made available to the mobile information device 12 through the uploading steps, which were previously described with reference to FIG. 3. In step 514, the mobile information device 12 displays the options for procuring or selecting the necessary tools for downloading the application, such as a subscription, a free demonstration, a re-download, or a factory preload.

The described embodiments of the invention can be implemented or applied in many different and useful ways. One such implementation comprises simultaneously downloading information onto a plurality of mobile information devices 12. This would serve the purpose of making an announcement or giving instructions to several people at once with just one upload and download of the application. Since this application is downloaded via wireless telecommunications, all intended mobile information device 12 users would receive the announcement or instructions, regardless of their current locations.

Another implementation of the described invention can be used in conjunction with a tracking mechanism. A customized application can be installed onto each mobile information device 12 of a particular group of people, such as a group of company drivers. This downloaded application can be used with a Global Positioning System (GPS) tracking mechanism; information from the GPS would be loaded onto a company server. This loaded server information could be used to instantly locate any and all drivers, or to locate a specific load of merchandise or goods. These cited implementations are just some of the examples in which the described invention could be implemented. Several other implementations or uses would be obvious to one of ordinary skill in the art.

Many different arrangements of the various components depicted, as well as components not shown, are possible without departing from the spirit and scope of the several embodiments of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer implemented method, comprising:
receiving a request from a computing client for uploading a selected website file and a related application from a selected website;
receiving said uploaded selected website file and the related application from said selected website by a web server, via an interconnected computing network;
assigning the uploaded selected website file and the related application to a number associated with an intended recipient via an inter-communications server;
sending a notification of said uploaded selected website file and the related application from said web server to the intercommunications server via said interconnected computing network;
sending an availability notification of said uploaded selected website file and the related application from said inter-communications server to the intended recipient via a wireless gateway connection;
receiving a selection from the intended recipient to procure or select necessary tools for downloading the selected website file and the related application; and
wirelessly downloading said selected website file and the related application from the web server onto the intended recipient via a program executed on the intended recipient.

2. The method of claim 1, wherein said number comprises a plurality of telephone number designations for a respective plurality of intended recipients.

3. The method of claim 2, wherein said downloading occurs simultaneously onto each of said plurality of intended recipients.

4. The method of claim 3, wherein said simultaneous downloading onto each of said plurality of intended recipients comprises downloading a location designation tracking mechanism for each of said plurality of intended recipients.

5. The method of claim 3, wherein said simultaneous downloading onto each of said plurality of intended recipients comprises disseminating information to a plurality of users of said plurality of intended recipients.

6. The method of claim 1, wherein the intended recipient comprises a mobile device.

7. A computer and telecommunications system, comprising:
- a mobile information device;
- an information resource system;
- a wireless gateway to provide an interface between said mobile information device and said information resource system;
- a computing client having access to an interconnected computing network and to a website selected from said information resource system;
- a web server to receive an uploaded file and a related application from said website selected from said information resource system via said interconnected computing network; and
- an inter-communications server to receive a notification from said web server of said uploaded file and said related application via said interconnected computing network and to send an availability notification of said uploaded file and said related application to said mobile information device via a wireless gateway communication, wherein said mobile information device obtains one of a subscription, a free demo, a re-download, or a factory preload to wirelessly download said file and said related application from the web server via a program executed on the mobile information device.

8. The system of claim 7, further comprising:
- a telephone number designation for said mobile information device from said computing client.

9. The system of claim 8, wherein said telephone number designation comprises a plurality of telephone number designations for a respective plurality of mobile devices.

10. The system of claim 9, wherein said plurality of mobile devices receive said downloaded application simultaneously.

11. The system of claim 10, wherein said simultaneously downloaded application further comprises a plurality of location designation tracking mechanisms for each of said plurality of mobile devices, respectively.

12. The system of claim 10, wherein said simultaneously downloaded application further comprises an information dissemination to each of said plurality of mobile devices.

13. The system of claim 12, wherein said information dissemination comprises an announcement.

14. The system of claim 12, wherein said information dissemination comprises instructions.

15. The system of claim 8, further comprising: assigning the uploaded file and the related application to the designated telephone number via the inter-communications server.

* * * * *